United States Patent
Muenkel

(10) Patent No.: US 9,330,080 B2
(45) Date of Patent: May 3, 2016

(54) METHODS AND SYSTEMS TO FACILITATE PROVIDING SPREADSHEET AND DATABASE DATA TO USERS VIA A SOCIAL NETWORK

(75) Inventor: Christian Muenkel, Reilingen (DE)

(73) Assignee: SAP SE, Walldorf (DE)

(*) Notice: Subject to any disclaimer, the term of this patent is extended or adjusted under 35 U.S.C. 154(b) by 387 days.

(21) Appl. No.: 13/169,325

(22) Filed: Jun. 27, 2011

(65) Prior Publication Data

US 2012/0330995 A1    Dec. 27, 2012

(51) Int. Cl.
*G06F 17/30* (2006.01)
*G06F 17/24* (2006.01)

(52) U.S. Cl.
CPC ........ *G06F 17/246* (2013.01); *G06F 17/30424* (2013.01)

(58) Field of Classification Search
CPC ................ G06F 17/30424; G06F 17/30864; G06F 17/30477; G06F 17/246
USPC ............ 707/608, 769, 999.001; 715/212, 219
See application file for complete search history.

(56) References Cited

U.S. PATENT DOCUMENTS 7,454,701 B2 * 11/2008 Graeber ........................ 715/267
8,423,612 B2 *  4/2013 Chen et al. .................... 709/204
2007/0136666 A1 *  6/2007 Khen et al. .................... 715/538
2007/0233811 A1 * 10/2007 Rochelle et al. .............. 709/219
2011/0296507 A1 * 12/2011 Khosrowshahi et al. ......... 726/7

OTHER PUBLICATIONS

Régis Saint-Paul et al., Data Services in your Spreadsheet!, ACM, 2008, 690-694.*

* cited by examiner

*Primary Examiner* — Jean B Fleurantin
(74) *Attorney, Agent, or Firm* — Schwegman Lundberg & Woessner, P.A.

(57) ABSTRACT

A spreadsheet application platform facilitates accessing a spreadsheet stored using a spreadsheet database at a server computer. The spreadsheet application platform includes a computer-implemented social network, and a publisher may use the social network to publish a spreadsheet so that other users of the social network may subscribe to and access the spreadsheet's data. Further, a subscribed user may generate other spreadsheets that reference the publisher's spreadsheet via the application platform. When a stored value for a cell of the publisher's spreadsheet is updated at the spreadsheet database, the application platform may generate update requests for one or more target spreadsheet cells that reference the updated cell. An update request may indicate that a target cell is to be updated, and the application platform may process a plurality of update requests in parallel to update the stored values for a corresponding plurality of spreadsheet cells.

29 Claims, 9 Drawing Sheets

METHODS AND SYSTEMS TO FACILITATE PROVIDING SPREADSHEET AND DATABASE DATA TO USERS VIA A SOCIAL NETWORK

TECHNICAL FIELD

The present disclosure relates to enterprise applications. In an example embodiment, a spreadsheet application platform facilitates sharing spreadsheet and database data with users that subscribe to this data.

BACKGROUND

Members of an organization oftentimes use spreadsheets to represent data, and to communicate this data with other members of the organization. Spreadsheets can be used to generate data, for example, by using an expression within a spreadsheet cell. The spreadsheet may also generate charts and graphs to display a visualization for a trend or a segmentation in the spreadsheet data. Further, a user's spreadsheet may also import data from a reference document that is stored locally at the user's computing device. Unfortunately, when this reference document is missing at the user's local computing device, the spreadsheet may not present useful data to the user.

The user may share his spreadsheet data with a colleague by sending the spreadsheet document to the colleague either by providing the colleague with a storage device (e.g., a compact disc) that includes the spreadsheet document, or by sending the document to the colleague via a communication medium (e.g., an e-mail). However, if the user's colleague does not have a copy of the reference document stored at his local computing device, the colleagues computing device may not be able to display certain cells or charts of the spreadsheet. Moreover, if the user updates the spreadsheet document or the reference document at his computing device, the user's colleague may not be able to view the updated values until he receives a new copy of the spreadsheet document.

BRIEF DESCRIPTION OF THE DRAWINGS

The present disclosure is illustrated by way of example, and not limitation, in the figures of the accompanying drawings, in which like reference numerals indicate similar elements unless otherwise indicated. In the drawings.

DESCRIPTION OF EXAMPLE EMBODIMENTS

Overview

In some example embodiments, a spreadsheet application platform facilitates sharing spreadsheet data. The application platform may, for example, include a computer-implemented social network that can store a user's spreadsheet in a database at a server computer, and can make the spreadsheet's contents available to other users of the computer-implemented social network when they subscribe to the spreadsheet. Thus, a "spreadsheet" in this disclosure may include a collection of data stored in a database that may be gathered and presented to a user via a user interface at the user's client device (e.g., using a two-dimensional grid of data cells). For example, the spreadsheet's data may be stored in a single database table, or the spreadsheet's data may be joined from multiple database tables based on an expression associated with the spreadsheet.

In some example embodiments, a spreadsheet's representation may include a description for a two-dimensional grid of cells. This representation may include a description for how the stored value for a spreadsheet cell is to be updated at the database, and how the stored value may be retrieved from the database (e.g., using a database query, or using database parameters that are used to generate a database query for the spreadsheet cell). This representation may also include reference information for the spreadsheet cells. For example, the reference information may indicate a static reference that indicates the placement of this spreadsheet cell within the two dimensional grid of cells, and may indicate a logical reference that may be used by other spreadsheet cells (either from the same spreadsheet or from other spreadsheets) to reference this spreadsheet cell.

A publisher may publish the spreadsheet using the computer-implemented social network to advertise the spreadsheet to other users of the social network, or to make this spreadsheet available to other spreadsheets of the same publisher. Further, the publisher may also use the computer-implemented social network to recommend the spreadsheet to certain users of the social network. A user of the social network may then submit a subscription request for this spreadsheet via the social network, and the publisher may select an access level for this user.

Further, this subscribing user may also use the application platform to publish a spreadsheet that references one or more cells of the publisher's spreadsheet. When the server computer updates a stored value for a cell in the publisher's spreadsheet, the application platform may generate an update request for a target cell of the subscribing user's spreadsheet that references the updated cell. Further, the subscribing user may receive a notification from the computer-implemented social network indicating the update request for his spreadsheet, and the subscribing user may choose whether and/or when to update his spreadsheet.

Example System

Figure 1:
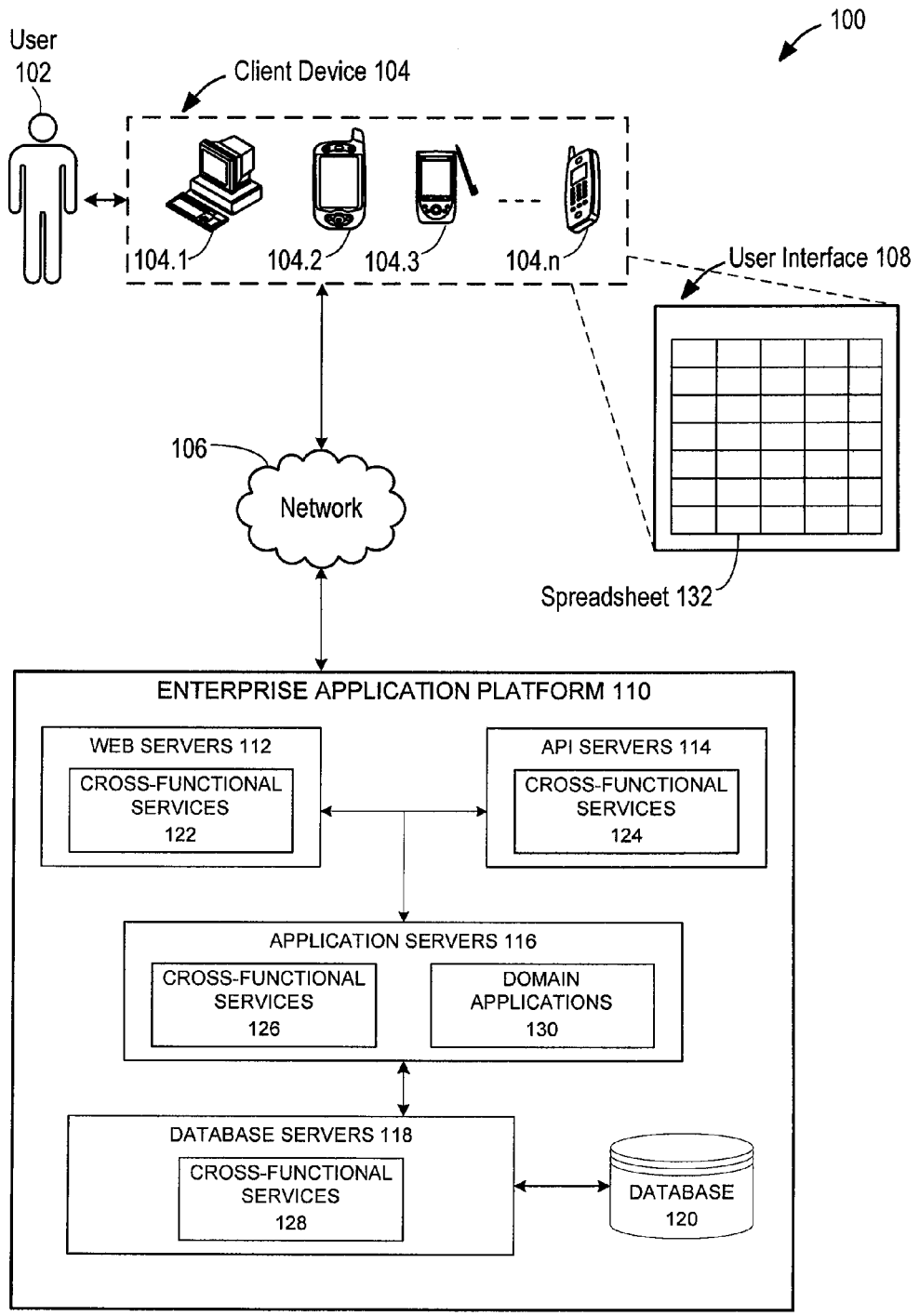
FIG. 1 shows an example network diagram depicting an example system having a client-server architecture.

FIG. 1 shows an example network diagram depicting an example system 100 having a client-server architecture. The system 100 includes a client device 104, a network 106, and an enterprise application platform 110. The client device 104 may be any suitable computing device, such as a personal computer 104.1, a smart phone 104.2, a personal digital assistant 104.3, a mobile phone 104.n, a laptop, a computing tablet, or any other device suitable for interfacing with the enterprise application platform 110 via the network 106. Further, the client device 104 may present a user 102 with a user interface 108. For example, the user interface 108 may be a web browser or a spreadsheet application (e.g., the Internet Explorer® web browser developed by Microsoft® Corporation of Redmond, Wash. State, or a spreadsheet application that executes on the client device 104 and communicates with the enterprise application platform 110).

In some example embodiments, the user 102 may use the user interface 108 to access server-side functionality and data that may be provided by the enterprise application platform 110. For example, the user 102 may access a spreadsheet functionality of the enterprise application platform 110 to receive a spreadsheet 132, which may be displayed to the user 102 by the user interface 108 of the client device 104.

The enterprise application platform 110 (e.g., a combination of machines and software) may provide server-side functionality to the client device 102 via the network 106 (e.g., the Internet). The enterprise application platform 110 may include web servers 112 and Application Program Interface (API) servers 114, which are coupled to application servers 116, and may provide web and programmatic interfaces for the client device 104. The API servers 114 may, for example, implement a RESTful web service that conforms to the Representational State Transfer (REST) architecture, and may implement an Open Data Protocol (OData). In some example embodiments, the user 102 may use the web browser at the client device 104 to send a request to the web servers 112 for the spreadsheet 132, and the web servers 112 may respond to the client device 104 by providing a web page that includes the spreadsheet 132. As another example, the user 102 may use a client-side application (e.g., a spreadsheet application) that may interface with the API servers 114 to invoke a functionality provided by the application servers 116, and to send and/or receive data from the database servers 118.

The application servers 116 may host domain applications 130, and are coupled to one or more databases servers 118 (e.g., via the network 106) that facilitate access to the database 120. Further, the web servers 112, API servers 114, application servers 116, and database servers 118 may host cross-functional services 122-128. In some example embodiments, the cross-functional services 122-128 may provide services for users and/or applications of the enterprise application platform 110 (e.g., for the client device 104 and/or the domain applications 130). For instance the cross-functional services 122-128 may provide portal services (e.g., web services), database services, and connectivity to the domain applications 130 for the user 102 of the client device 104. In addition, the cross-functional services 122-128 may provide a platform for delivering enhancements to existing applications (e.g., functional enhancements to an application at the client device 104, or to the domain applications 130), and a platform for integrating third party and legacy applications (e.g., a third party application server) with the domain applications 130.

While the system 100 shown in FIG. 1 employs a client-server architecture, the present invention is of course not limited to such an architecture, and could equally well find application in a distributed, or peer-to-peer, architecture system.

Example Spreadsheet Access

In some example embodiments, an entity (e.g., an individual or an organization) may use the enterprise application platform 110 to share a spreadsheet (or a subset of cells from the spreadsheet) with other entities that may use the spreadsheet data within their own spreadsheets. For example, entities may use the shared information to generate aggregated data that spans various groups or organizations (e.g., state census data that is gathered from a plurality of counties), to generate statistical data for a research project (e.g., cancer survival rates across various demographic categories), to verify account information that reflects transactions across partnering institutions (e.g., business-to-business sales transactions), and/or the like.

Figure 2:
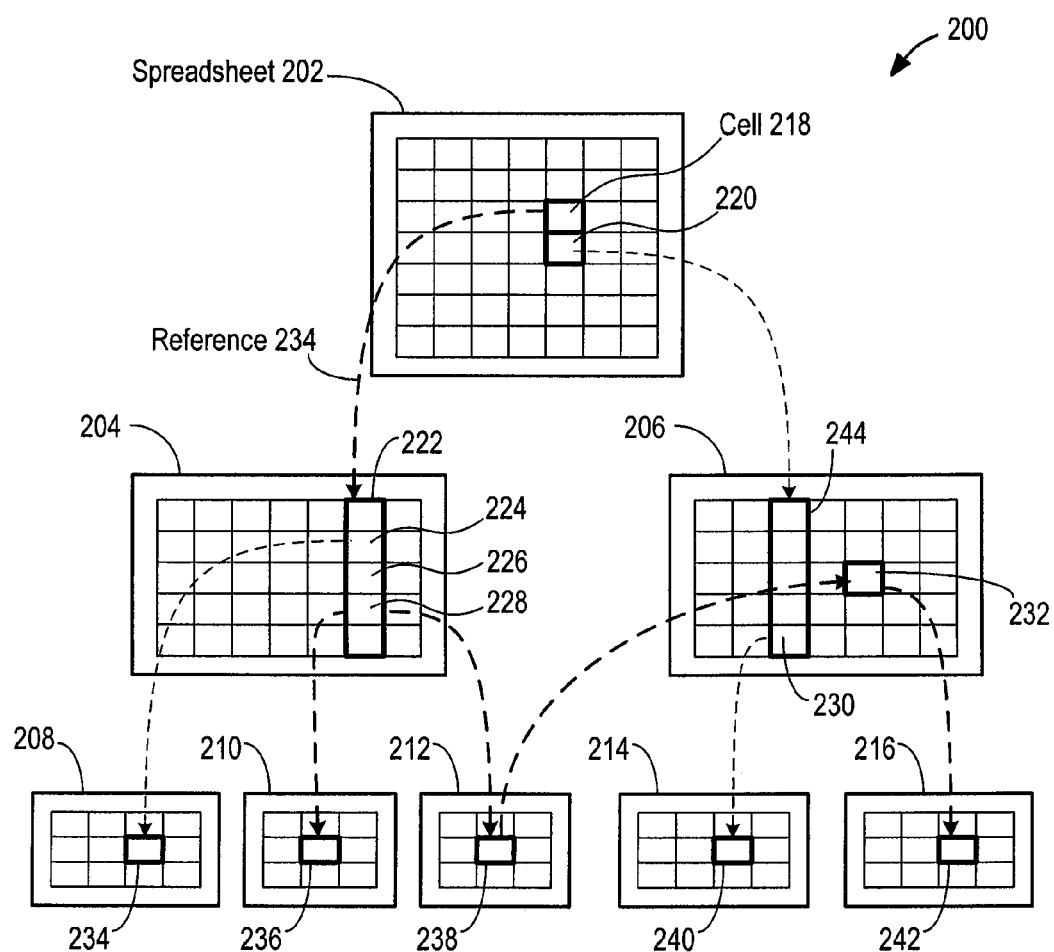
FIG. 2 shows a diagram illustrating an example spreadsheet collection that includes a plurality of interrelated spreadsheets from various entities.

FIG. 2 shows a diagram illustrating an example spreadsheet collection 200 that includes a plurality of interrelated spreadsheets from various entities. In some example embodiments, the example spreadsheet collection 200 may be stored and operated on by the enterprise application platform 110 and, accordingly, is described by way of example with reference thereto. A spreadsheet of the collection 200 is assigned to an entity (hereinafter referred to as the "spreadsheet owner," or "owner") that may edit the properties and data of the spreadsheet, and the spreadsheet may be accessed by various other entities to which the spreadsheet owner has allowed access to the spreadsheet. An entity may be an individual (e.g., a researcher), a non-profit group (e.g., The American Red Cross™), a company, and/or the like.

The spreadsheet may include cells that have static data (e.g., the cell 226). This static data may include a number, a date, a phrase, or the like. The spreadsheet may also include cells that have an expression that references one or more other cells (e.g., a target cell). The term "target cell" is hereby used to describe a cell that includes a reference to another cell, and may receive data updates from this referenced cell. In some example embodiments, the database 120 may store a record that includes the latest value for an individual cell of a spreadsheet. Furthermore, in some example embodiments, the enterprise application platform 110 may not update the record for the cell until the spreadsheet owner has chosen to update the cell. For example, a target cell may include an expression that may be used to compute a value from one or more other cells (e.g., the target cell 228 computes a value from the reference cells 236 and 238) and, when at least one of the reference cells has been updated, the spreadsheet owner may decide whether to update the record with a new computed value.

In some example embodiments, a spreadsheet owner may allow other entities to view certain cells of his spreadsheet as a way to share selective information with these entities. For example, the enterprise application platform 110 may provide the user 102 with a user interface 108 that allows the user 102 to submit a subscription request for a cell of the spreadsheet (or to the spreadsheet as a whole). Furthermore, the enterprise application platform 110 may subscribe the user 102 to this spreadsheet cell when the spreadsheet owner accepts the subscription request, and/or when the user 102 pays a subscription fee that that the spreadsheet owner has chosen for this cell.

The subscription request may indicate a level of access that the user 102 is requesting for the spreadsheet cell. In some example embodiments, the level of access for a spreadsheet cell may include a read-write access, a read-only access, and a results-only access. The read-write access may allow a subscribed user to read and to modify the expression and/or the stored value for the spreadsheet cell. The read-only access may allow the subscribed user to read the expression and the stored value for the spreadsheet cell, but may not allow the subscribed user to edit the expression nor the stored value for the spreadsheet cell. Further, the results-only spreadsheet cell may allow the subscribed user to read the stored value for the spreadsheet cell, but may not allow the subscribed user to read the expression for the spreadsheet cell, and may not allow the subscribed value to modify the expression nor the stored value for the spreadsheet cell. In some example embodiments, only one user may have read-write access to the spreadsheet at any point in time. Thus, for example, the subscription request from the user 102 may indicate a request for a read-only access or a results-only access, but may not indicate a request for a read-write access.

In some example embodiments, the enterprise application platform 110 may use the subscription information from a user to determine whether the cells that he owns have sufficient access to obtain a stored value from other cells that they reference. Thus, this subscription information allows a publisher to share spreadsheet information with others based on subscriptions to selected cells, and allows this publisher to modify the access levels for his subscribers as necessary.

For illustration purposes, the spreadsheet 202 may be associated with a government agency that subscribes to spreadsheets owned by various publicly-traded companies to aggregate and report revenue information from these companies. Further, the spreadsheets 204 and 206 may be associated with separate companies that have given the government agency a results-only permission to their finance-related spreadsheets. The government agency may use the enterprise application platform 110 to update the data in the spreadsheet 202 at the start of a fiscal quarter to obtain quarterly revenue reports.

Spreadsheet 204 may, for example, correspond to a profit and loss spreadsheet for the General Motors Company. Further, column 222 may correspond to profit information across various divisions, and its cells may obtain their data from the spreadsheets 208-212 that are owned by managers of these separate divisions. The cell 224 may obtain its value directly from cell 234 of the spreadsheet 208 that, for example, includes profit information from licensing agreements with other companies. As a further example, the cell 228 may include profit information from car sales across all car models, and thus the cell 228 may include an expression that computes a value from cells 236 and 238 (of the spreadsheets 210 and 212, respectively) that may indicate sales profit numbers for these various car models.

Spreadsheet 206 may, for example, correspond to a profit and loss spreadsheet for the Bridgestone Corporation, and column 222 may correspond to profit information that is being made available to the government agency. The cell 230 may obtain its value directly from the cell 240 of the spreadsheet 214 that, for example, includes sales profit information. Moreover, the cell 232 may obtain its information from the cell 242 of the spreadsheet 216 that, for example, may include sales information for a variety of customer accounts. For example, the cell 232 may include sales information that is being made available to the General Motors Company as a customer, and thus the Bridgestone Corporation may assign, to the General Motors Company, results-only access to the cell 232.

As a further example, the cell 238 (that may be assigned to the General Motors Company) may include an expression that references a cell of one or more other companies (e.g., to verify numbers from a business partner's spreadsheet). Thus, as an example, the cell 238 may include an expression that uses the sales data obtained from the cell 232 (that may be assigned to the Bridgestone Corporation) to verify the tire-related expenses for a certain car model throughout a previous fiscal quarter or fiscal year when computing the profits for that car model.

In some example embodiments, a reference to a spreadsheet cell may include a static reference that indicates a cell within a spreadsheet, or may include a logical reference (e.g., an alphanumeric identifier) that may be used within an expression to reference this spreadsheet cell. The logical reference may be, for example, a unique identifier that is selected for the spreadsheet cell by the enterprise application platform 110, or may be a name that has been selected for the spreadsheet cell by the spreadsheet's owner (which may or may not be a unique identifier). If the spreadsheet owner has indicated a name for the spreadsheet cell (e.g., by using a cell editor of the user interface 108 shown in FIG. 1), the enterprise application platform 110 may associate the cell's name with a namespace attributed to this spreadsheet owner. The enterprise application platform 110 may use a plurality namespaces for a plurality of spreadsheet owners to facilitate differentiating between spreadsheet cells of the same name from different spreadsheet owners.

The database 120 may store, for a spreadsheet owner, cell aliases that the spreadsheet owner may use as references to spreadsheet cells. Thus, for example, if the spreadsheet owner is subscribed to two spreadsheet cells with the same name from different namespaces, the spreadsheet owner may indicate an alias to a same-name spreadsheet cell. Then, the spreadsheet owner may use this alias to reference the same-name spreadsheet cell (e.g., within an expression) as an alternative to explicitly indicating the namespace and cell name to this spreadsheet cell.

Some spreadsheet owners may desire to generate a spreadsheet that aggregates data from other spreadsheet cells that satisfy a condition. In some example embodiments, the enterprise application platform 110 may extract a database query from a cell's expression, and may process the database query to determine a value for the spreadsheet cell. Thus, the spreadsheet owner may create an expression for a spreadsheet cell that includes a database query. This database query may, for example, include search parameters for a column heading or a row heading for a table within a spreadsheet, and/or may include search parameters for a property of a spreadsheet cell. The property may indicate, for example, descriptive text that has been attributed to the spreadsheet cell, a modification date (e.g., the last date at which the cell's expression was modified), a refresh date (e.g., the last date at which the cell's stored value was updated), a logical name for the cell's spreadsheet, the spreadsheet owner, and/or the like. Further, the database query may also indicate a sort parameter that indicates how the search results are to be sorted.

The enterprise application platform 110 may process the search query by using the database servers 118 to search through a collection of spreadsheets (or individual spreadsheet cells) to which the spreadsheet owner is subscribed. Further, the database servers 118 may also search through other spreadsheets that have been made public by their respective spreadsheet owners. In some example embodiments, the expression of the spreadsheet cell may explicitly indicate how multiple search results are to be handled. For example, the expression may indicate that the first value of the search result is to be used to compute an updated value of the spreadsheet cell. As another example, the expression may indicate that a value is to be generated from the collection of search results (e.g., a summation, a product, or a statistical value such as a median value or a standard deviation). If the expression does not indicate how multiple search results are to be handled, the enterprise application platform 110 may select a determinable value from the search results (e.g., may select the first value from the search results).

In some other example embodiments, the spreadsheet owner may indicate that the results of the expression are to be presented over an area of the spreadsheet. For example, the spreadsheet owner may associate a set of neighboring cells with the expression, and the expression may include a search query that results in multiple search results. Then, the enterprise application platform 110 may iterate through these cells and the search results to compute values for individual cells.

Example Spreadsheet Processing

In some example embodiments, the enterprise application platform 110 may propagate cell data through a plurality of cells in the spreadsheet collection 200. For example, the user 102 may have access to view the spreadsheet 204, and may request that an updated value be computed for the cell 228. Then, in response to this request, the enterprise application platform 110 may access the cells 236 and 238 to obtain their stored values, and may compute an updated value for the cell 228 based on these stored values. Further, when the owner of the cell 238 updates its value, the enterprise application platform 110 may generate an update request for the cell 228.

As another example, if the user 102 owns spreadsheet 216 and the user 102 enters an updated value into the cell 242 of the spreadsheet 216, the enterprise application platform 110 may generate an update request for the target cell 232 to notify the owner of the spreadsheet 206 of the updated value. Then as the owners for other target cells receive and accept update requests, the updated values may propagate through other cells of the spreadsheet collection 200 that are associated with the cell 242 through a web of references (e.g., the bold dashed arrows of FIG. 2).

Figure 3:
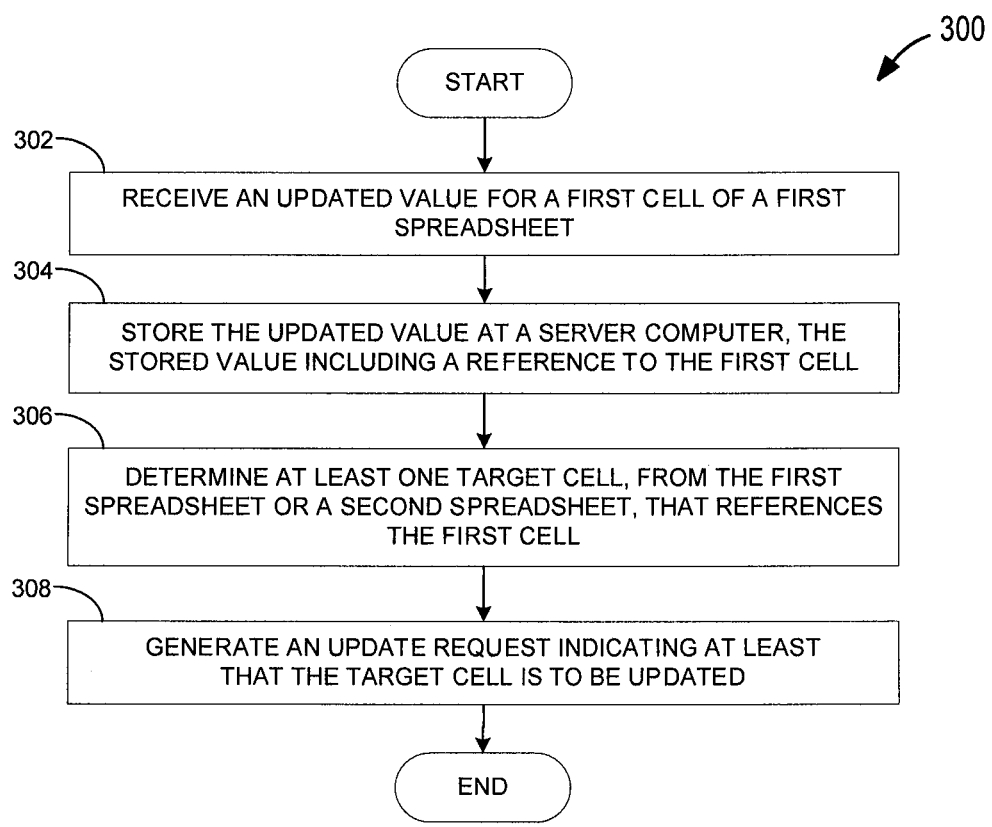
FIG. 3 shows a flowchart illustrating an example method for processing an updated value to a spreadsheet cell.

FIG. 3 shows a flowchart illustrating an example method 300 for processing an updated value to a spreadsheet cell. In some embodiments, the method 300 may be performed using the enterprise application platform 110 and, accordingly, is described by way of example with reference thereto. The method 300 may begin, at operation 302, by receiving an updated value for a spreadsheet cell. For example, the user 102 may use the computing device 104 to enter a new value into cell 242 of the spreadsheet 216, or the enterprise application platform 110 may compute a new value for cell 238 of the spreadsheet 212 based on an updated value for the cell 232 of the spreadsheet 206.

At operation 304, the method 300 may use the database server 118 to store the updated value. For example, the database server 118 may store a record for the updated cell in the database 120 so that the stored record includes the updated value and includes a reference to the updated cell (e.g., a reference to the cell 236 of the spreadsheet 210). At operation 306, the method 300 may determine at least one target cell that references the updated spreadsheet cell. The target cell may be of the same spreadsheet as the updated cell, or may be of a different spreadsheet. Then, at operation 308, the method 300 may generate update requests indicating that the target cells are to be updated. As an example, if an updated value is stored for the cell 232 of the spreadsheet 206, the method 300 may generate an update request indicating that the cell 238 of the spreadsheet 212 is to be updated.

Figure 4:
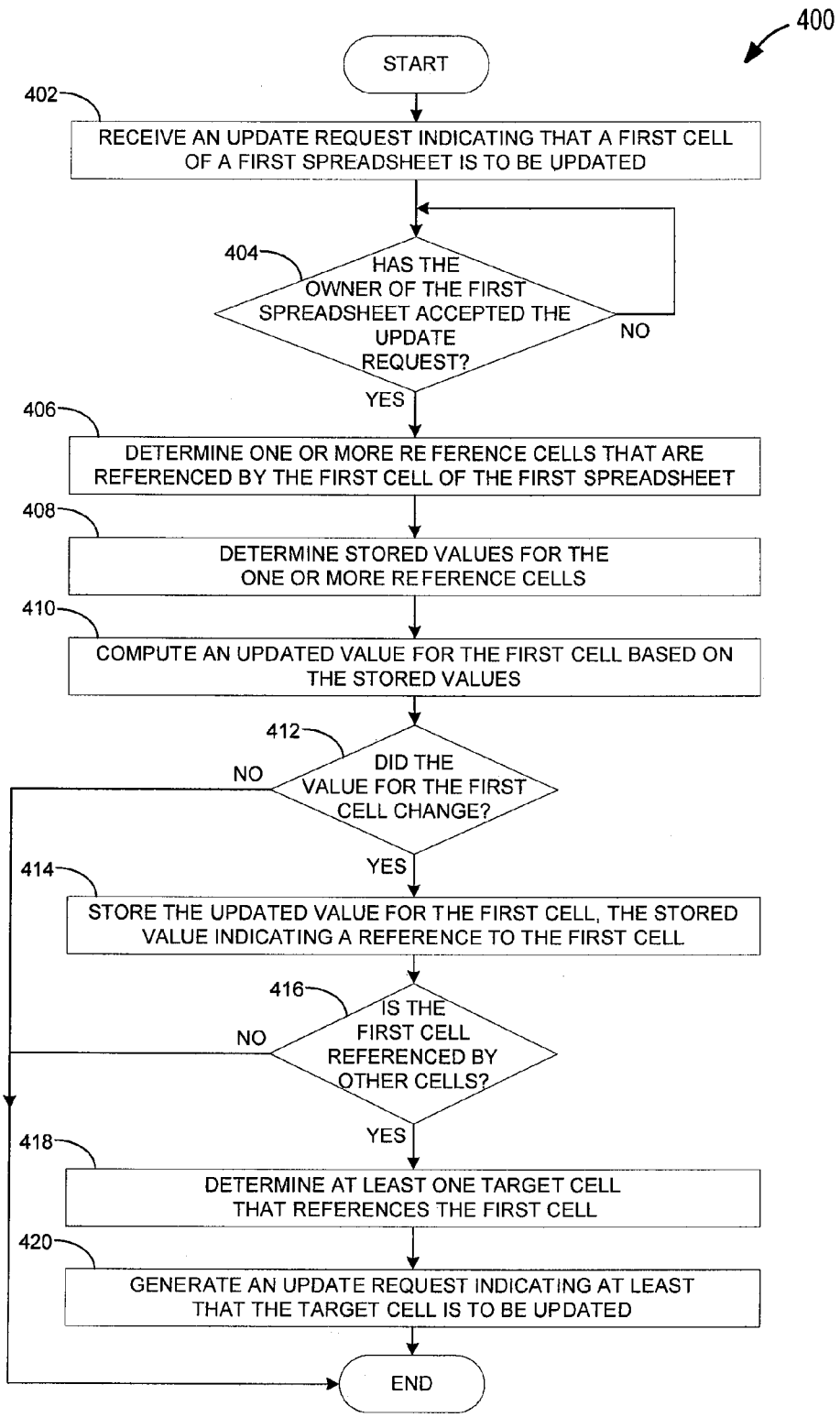
FIG. 4 shows a flowchart illustrating an example method for processing to an update request.

FIG. 4 shows a flowchart illustrating an example method 400 for processing to an update request. In some embodiments, the method 400 may be performed using the enterprise application platform 110 and, accordingly, is described by way of example with reference thereto. The method 400 may begin, at operation 402, by receiving an update request indicating that a cell of a spreadsheet is to be updated. The method 400 may receive the update request from the computing device 104 of a subscribed user that is requesting an updated value from the spreadsheet, or may receive the update request when the enterprise application platform 110 generates the update request in response to generating an updated value for a related cell (e.g., a cell that references, or is referenced by, the cell that is to be updated). The cell that is to be updated may include an expression that references one or more other cells (e.g., from the same spreadsheet and/or from other spreadsheets), and may need to have its stored value updated when any one of the reference cells obtains an updated value.

In some example embodiments, when the method 400 receives the update request for the target cell that is to be updated, the enterprise application platform 110 may notify the owner of the target cell that this spreadsheet cell is ready to be updated. For example, if the user 102 uses a web browser on the client device 104 to view the spreadsheet 132, and an update request exists for a cell of the spreadsheet 132, the web servers 112 may generate a user interface 108 that includes a notification that the cell is ready to be updated, or the web browser may receive the notification for this cell from the API servers 114 (e.g., via an asynchronous request to the API server 114). Also, if the user 102 uses a native application of the client device 104 (e.g., a spreadsheet application), the native application may receive the notification from the API servers 114 via a server push technology or a client pull technology.

In some example embodiments, the notification may include a display element that represents the update request (e.g., a button or a flag), and that may be displayed next to the cell in the user interface 108. The user may use an input device of the client device 104 to click on this display element (e.g., a keyboard button, a mouse, a touch pad, a touch screen, and/or the like), at which point the client device 104 may use the web servers 112 and/or the API servers 114 to notify the enterprise application platform 110 that the owner of the target cell has accepted the update request for the spreadsheet cell.

At operation 404, the method 400 may determine whether the owner of the spreadsheet has accepted the update request. If the method 400 determines that the owner of the spreadsheet has not accepted the update request, the method 400 may return to operation 404 to wait for the owner to accept the updated request. However, if the method 400 determines that the owner has accepted the update request, the method 400 may continue to operation 406 to determine one or more reference cells that are referenced by the cell being updated. Then, at operation 408, the method 400 may determine the stored values for the one or more referenced cells. At operation 410, the method 400 may compute an updated value for the selected cell based on the expression for the target cell and the stored values for the one or more reference cells.

At operation 412, the method 400 may determine whether the stored value for the selected cell has changed (e.g., whether the updated value for the selected cell is different than its stored value). If the method 400 determines that the value for the selected cell has not changed, the method 400 may end to avoid generating unnecessary update requests. Otherwise, if the method 400 determines that the value for the selected cell has changed, the method 400 may continue to operation 414 to store the updated value for the selected cell in the database 120 (e.g., in a record of the database 120 that includes a reference to the selected cell).

At operation 416, the method 400 may determine whether the selected cell is referenced by any other cells. If the method 400 determines that no other cells reference the selected cell, the method 400 may end. Otherwise, if it is referenced by other cells (by target cells), the method 400 may continue to operation 418 to determine at least one target cell that references the selected cell. The target cells may be of the same spreadsheet as the selected cell and/or they may be of a different spreadsheet. Then, at operation 420, the method 400 may generate update requests for individual target cells indicating that these target cells are to be updated.

In some example embodiments, the enterprise application platform 110 may compute an updated value for a plurality of spreadsheet cells in parallel. For example, the enterprise application platform 110 may use a concurrent programming language (e.g., the Scala programming language) to process a plurality of update requests (e.g., operations 406-410 of FIG. 4) using a plurality of computing devices. The enterprise application platform 110 may, for example, create objects (e.g., using a Scala object) to represent spreadsheet cells that are stored at the database 120. Further, the enterprise application platform 110 may use a plurality of cell objects to compute updated values, in parallel, for a corresponding plurality of spreadsheet cells.

A cell object may include an identifier for a spreadsheet cell, a stored value for the spreadsheet cell, an expression of the spreadsheet cell that is used to compute an updated value for the cell, identifiers to other cells that are referenced by (and/or that include a reference for) the spreadsheet cell, and/or the like. The cell object may also include variables that facilitate the concurrent processing of update requests. For example, the cell object may include references to other cell objects that represent other related cells (e.g., other cells that reference, or are referenced by, the cell object's spreadsheet cell). Further, the cell object may use these cell object references to send and/or receive messages to/from these other cell objects, which facilitates propagating a cell's updated value to other related spreadsheet cells.

In some example embodiments, the enterprise application platform 110 may use the concurrent programming language (e.g., Scala) at the application servers 116 to create a first cell object (e.g., at operation 404) for a spreadsheet cell that is to be updated (e.g., for the cell 232 of FIG. 2), and to create a second cell object (e.g., at operations 406-408) for a spreadsheet cell that is being referenced by the spreadsheet cell that is to be updated (e.g., for the cell 242 of FIG. 2). Then, at operation 410, the second cell object may send the stored value (e.g., using asynchronous message-passing) for the referenced spreadsheet cell to the first cell object that computes the updated value for the spreadsheet cell that is to be updated.

Further, in some example embodiments, the second cell object may also send a message to the first cell object when the stored value for the referenced cell is updated at the database 120. In some example implementations, the enterprise application platform 110 may use the concurrent programming language (e.g., Scala) at the database servers 118 to create a cell object for the referenced cell when its stored value is updated, and this cell object may send a message to the first cell object to compute an updated value for its spreadsheet cell.

Example Aggregate Spreadsheets

In some example embodiments, the spreadsheet collection 200 may correspond to various spreadsheets that are assigned to individuals of an organization. For example, the spreadsheet 202 may correspond to a sales director, and the spreadsheets 208-216 may correspond to various salesmen. The individual members of the organization may update their respective spreadsheets (e.g., the owner of the spreadsheet 208 may update the cell 234), and they may view other spreadsheets of the group (e.g., the owner of the spreadsheet 208 may view the spreadsheets 210-216). Further, in some example embodiments, the individual members may not edit the spreadsheets that they do not own (e.g., the owner of the spreadsheet 208 may not update the spreadsheet 210 if he does not own it).

In further example embodiments, a spreadsheet of the spreadsheet collection 200 may be an aggregate spreadsheet that aggregates data from other spreadsheets in the spreadsheet collection 200. For example, the spreadsheet 204 may be an aggregate spreadsheet that represents salesmen in the United States, and thus it may aggregate data from the spreadsheets 208-212 that may be owned by domestic salesmen.

Also, the spreadsheet 206 may be another aggregate spreadsheet that represents salesmen from outside of the United States, and thus it may aggregate data from the spreadsheets 214-216 that may be owned by foreign salesmen.

Recall that in some example embodiments, a spreadsheet may be edited by at most one person (e.g., the spreadsheet owner). However, as an organization grows, it oftentimes becomes necessary to distribute certain responsibilities across multiple individuals. For example, if the spreadsheet 208 represents the west coast of the United States, it may become necessary for the organization to assign more than one salesmen as the popularity for the organization's products increases. This, however, may require multiple salesmen to enter sales data into the spreadsheet 208. In some example embodiments, the enterprise application platform 110 may distribute the ownership for cells of a spreadsheet to multiple users by partition the spreadsheet.

Figure 5:
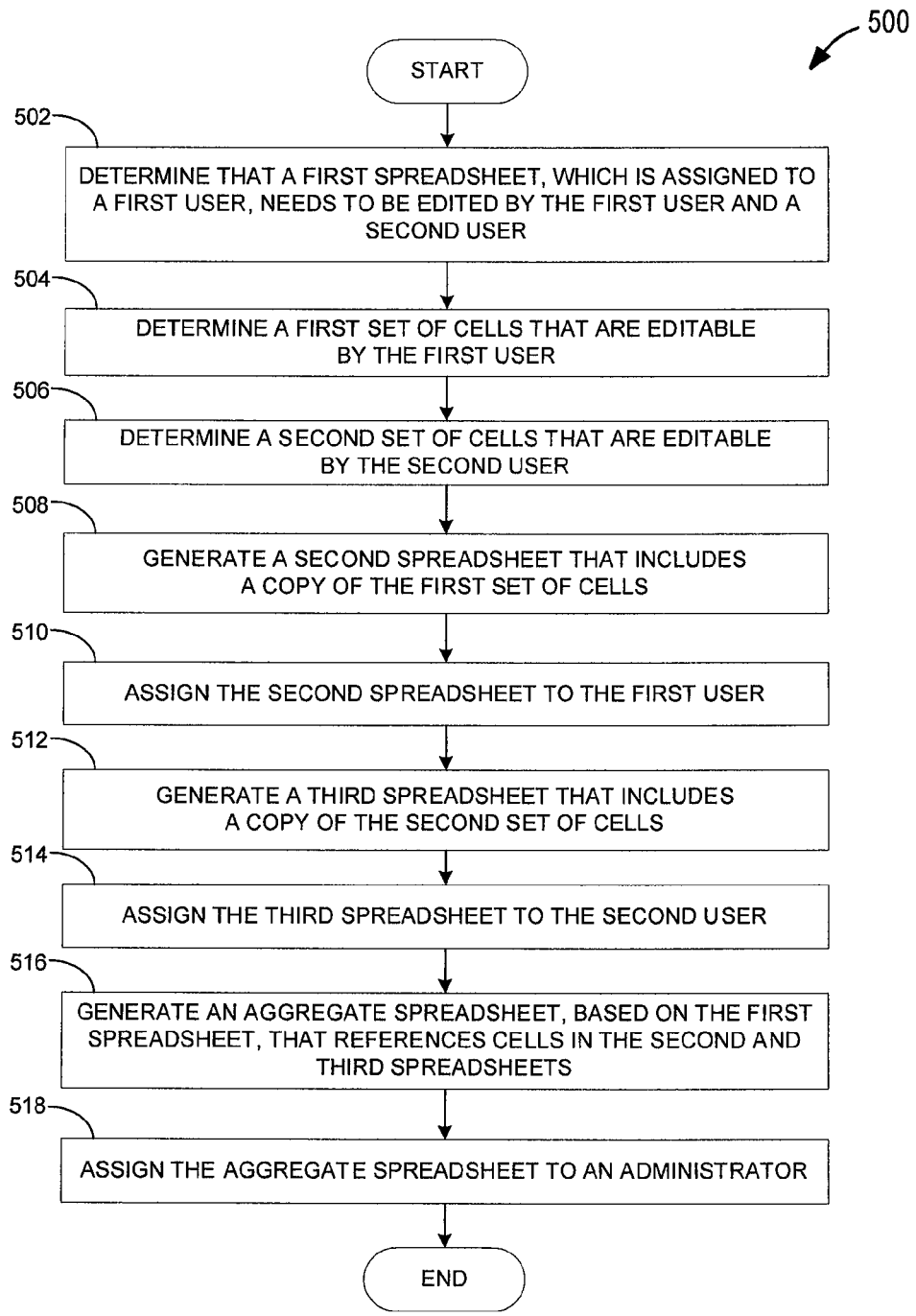
FIG. 5 shows a flowchart illustrating an example method for partitioning a spreadsheet into two spreadsheets that are assigned to different users.

FIG. 5 shows a flowchart illustrating an example method 500 for partitioning a spreadsheet into two spreadsheets that are assigned to different users. In some embodiments, the method 500 may be performed using the enterprise application platform 110 and, accordingly, is described by way of example with reference thereto. The method 500 may begin, at operation 502, by determining that a first spreadsheet, which is assigned to a first user, needs to be edited by the first user and a second user. Then, at operation 504, the method 500 may determine a first set of cells that are to be editable by the first user. Also, at operation 506, the method 500 may determine a second set of cells that are to be editable by the second user.

At operation 508, the method 500 may generate a second spreadsheet that includes a copy of the first set of cells. The method 500 may assign the second spreadsheet to the first user at operation 510. Further, at operation 512, the method 500 may generate a third spreadsheet that includes a copy of the second set of cells. The method may assign the third spreadsheet to the second user at operation 514.

At operation 516, the method 500 may generate an aggregate spreadsheet, based on the first spreadsheet, so that it references cells in the second spreadsheet and the third spreadsheet. For example, the aggregate spreadsheet may have the same structure and cell values as the first spreadsheet, but may obtain its values from corresponding cells in the second and third spreadsheets. Then, at operation 518, the method 500 may assign the aggregate spreadsheet to an administrator (e.g., a supervisor of the first and second users).

In some example embodiments, the second spreadsheet (or the third spreadsheet) may also have the same structure and data values as the first spreadsheet, but the cells that are not owned by the first user (or the second user) may obtain their values from corresponding cells of the aggregate spreadsheet (e.g., using cell references). In other example embodiments, the second spreadsheet (or the third spreadsheet) may have a similar structure as the first spreadsheet, but may not include the cells that are not owned by the first user (or second user). For example, the excluded cells may be left blank in the spreadsheet, or a row (or column) may be excluded if the row (or column) becomes empty after excluding cells from the spreadsheet.

In some example embodiments, at operations 516 and 518, the method 500 may generate the aggregate spreadsheet by modifying the first spreadsheet so that it references cells in the second and the third spreadsheets, and the method 500 may assign the first spreadsheet (as the aggregate spreadsheet) to the administrator. The method 500 may also generate the aggregate spreadsheet using other variations of the operations 502-518 that produce a combination of spreadsheets, cell references, and spreadsheet owner assignments that are similar to those of which are produced by the operations 502-518.

Example Computer-Implemented Social Network

In some example embodiments, a user may publish a spreadsheet using a computer-implemented social network. This social network may be implemented using the enterprise application platform 110 and, accordingly, is described by way of example with reference thereto. For example, the user 102 may use the client device 104 to receive a web application for the social network from the web servers 112, and a web browser on the client device 104 may present this web application to the user 102. Further, the web application on the client device 104 may send and/or receive information to/from the social network via the web servers 112 and/or the API servers 114. As another example, the client device 104 may include a native application that may send and/or receive information to/from the online social network via the web servers 112 and/or the API servers 114.

The enterprise application platform 110 may store user profile information in the database 120 for a number of users of the social network, and may store relationship information for these users. The relationship information for an individual user of the social network may indicate a set of first-degree friends that the user has confirmed a direct relationship with. Further, the social network (e.g., executing on the application servers 116) may use the relationship information for a plurality of users to determine a relationship graph for the plurality of users, and may use the database servers 116 to store the relationship graph on the database 120. The online social network may also use the database servers 116 to process search queries to determine the user's $N^{th}$ degree friends (e.g., other users of the social network with at most an $N^{th}$ degree of separation with the user). The online social network may determine a separation, N, between the user and an $N^{th}$ degree friend by determining a minimum number of members in the social graph that form a path between the user and the $N^{th}$ degree friend.

In some example embodiments, the user's profile information may indicate a job title for the user, a group affiliation within the organization, a list of projects which the user has participated in, a list of projects that the user is involved in, and/or the like. Further, the user's profile information may also indicate personal information that only select users may have access to. For example, the user's relationship information may include a list of "friends" that the user has given direct access to his personal information. The user may use a user interface on the client device 104 to assign a certain first-degree friend with access to his personal information, or may indicate that other users of at most an $N^{th}$ degree of separation (as determined by the social graph) are allowed access to his personal information (e.g., the user may indicate an explicit value for N, or may select an option from a control panel of the user interface that indicates a determinable value for N).

The relationship information may also include the user's relationship (as indicated by an organization chart) with other members of the organization. For example, the relationship information may include a list of first-degree colleagues that are directly associated with the user within the organization, as well as the type of relationship that the first degree colleague has with the user. Further, a first-degree colleague may be a co-worker within a company group, a direct supervisor, an employee or assistant, an intern, a contractor, and/or the like. The relationship information may also include $N^{th}$ degree colleagues that are members of the organization but are not directly associated with the user within the organization. The online social network may determine the separation, N, between the user and an $N^{th}$ degree colleague by determining a minimum number of members of the organization that form a path between the user and the $N^{th}$ degree colleague.

In some example embodiments, the user may publish a spreadsheet using the online social network for access by the user's friends, the user's colleagues, and/or for access by other users of the social network. For example, the spreadsheet collection 200 may include spreadsheets that multiple users of the online social network have published using the social network. The owner of a spreadsheet (e.g., the spreadsheet 206) may use the social network to allow a subscribing user to view this spreadsheet, or a subset of cells of this spreadsheet. Further, as an example, the owner of the spreadsheet 212 may subscribe to the spreadsheet 206 to have read-only access or results-only access to the cell 232 of the spreadsheet 206. When the owner of the spreadsheet 212 receives the read-only access or the results-only access to the cell 232, he may update the spreadsheet 212 so that the cell 238 includes an expression that references the cell 232 of the spreadsheet 206. In some example embodiments, the owner of the spreadsheet 206 may use a user interface on the client device 104 to assign an access level to other users of the social network (e.g., to assign results-only access to the owner of the spreadsheet 212).

Figure 6:
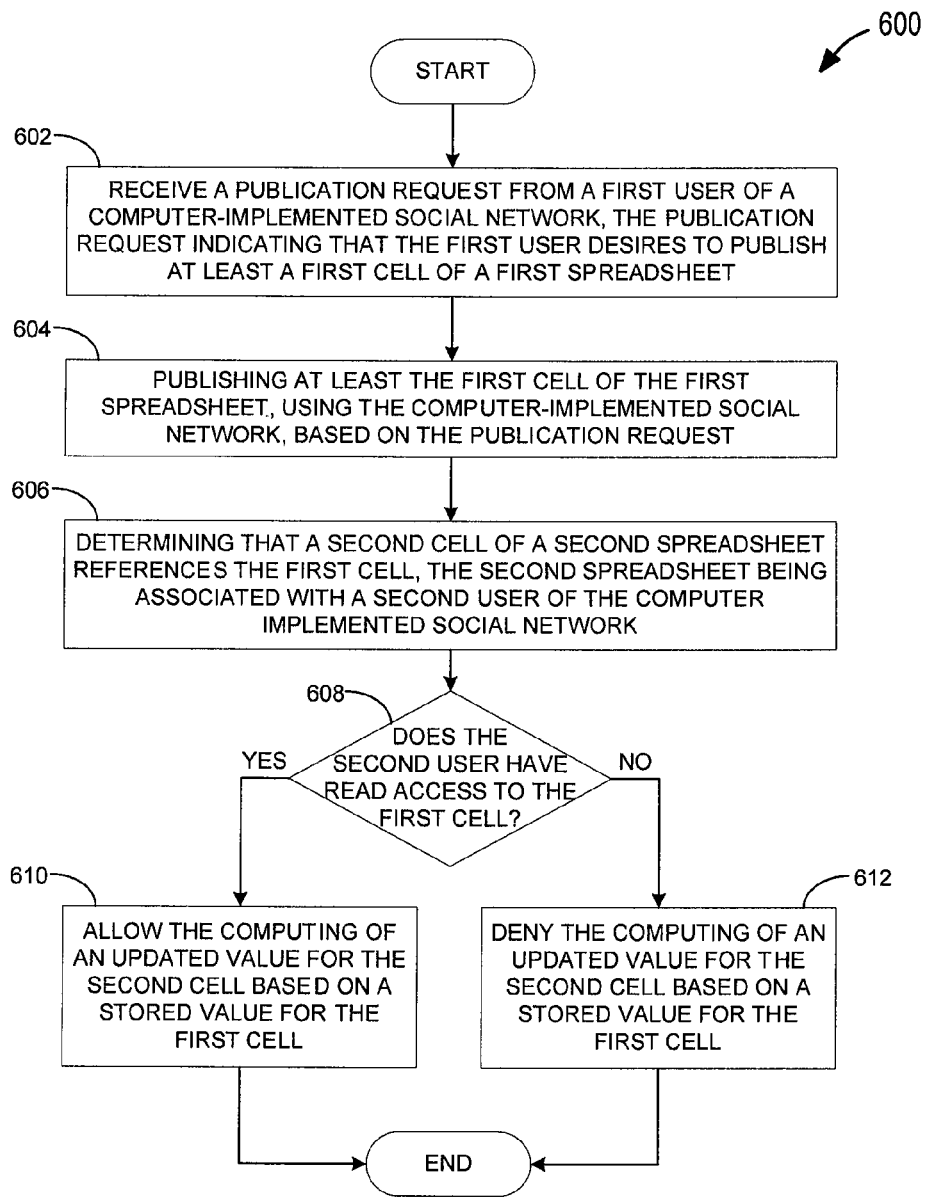
FIG. 6 shows a flowchart illustrating an example method for publishing a cell of a spreadsheet.

FIG. 6 shows a flowchart illustrating an example method 600 for publishing a cell of a spreadsheet. In some embodiments, the method 600 may be performed using the enterprise application platform 110 and, accordingly, is described by way of example with reference thereto. The method 600 may begin, at operation 602, by receiving a publication request from the user of the online social network (e.g., a publisher). The publication request may indicate a spreadsheet cell that the publisher desires to publish, and may indicate permission-related information for this spreadsheet cell. For example, the publication request may indicate that the column 244 of the spreadsheet 206 is to be public (e.g., any user of the online social network may have read-only or results-only access to these cells). Further, the publication request may also indicate explicit permission information for the cell 232 (and/or other cells of the spreadsheet 206) that indicates a level of access for other users of the online social network (e.g., to a first-degree friend or colleague). As an example, this permission information may indicate that the owner of the spreadsheet 212 has results-only access to the cell 232 of the spreadsheet 206.

In some example embodiments, the permission information may indicate a permission that is to be attributed to any user that has a certain relationship with the publisher (as determined by the relationship graph of the online social network). For example, the publisher may create a spreadsheet that includes sensitive information for a project that the publisher is working on. The publisher may allow results-only access to certain cells of the spreadsheet to first-degree colleagues, and may allow read-only access to these cells to a supervisor of any degree. This allows the colleagues to view the results without obtaining sensitive computation information. Also, this allows the publisher's supervisors to view the results, as well as to observe and to double-check the computations that the publisher is using to generate the results. As another example, the publisher may create a spreadsheet to manage his schedule, and may allow results-only access to this spreadsheet to friends that are up to $2^{rd}$ degree friends. This spreadsheet may, for example, indicate calendar information for the publisher's work schedule, the publisher's travel schedule and itinerary, and/or the like.

At operation 604, the method 600 may publish at least the spreadsheet cell indicated by the publishing request, using the computer-implemented social network, and based on the publication request. In doing so, the enterprise application platform 110 may use the database servers 118 to update the publisher's profile information in the database 120 so that it includes the permission information of the publication request. In some example embodiments, the enterprise application platform 110 may also update the profile information for a user that the publisher has allowed access to the published cell so that this user's profile information indicates that he has access to the published cell.

At operation 606, the method 600 may determine a target cell of a second spreadsheet that references the published cell of the publisher's spreadsheet. The target cell may be associated with another user of the online social network that may or may not have a direct association with the publisher. Then, at operation 608, the method 600 may determine whether the other user has access to read the published cell (e.g., as determined from the publisher's profile information, or from the other user's profile information). If the method 600 determines that the other user has access, the method 600 may continue to operation 610 to allow the target cell's stored value to be updated based on the published cell's stored value (e.g., by allowing the enterprise application platform 110 to compute an updated value for the target cell based on an expression of the target cell that references the published cell). However, if the method 600 determines that the other user does not have access to the published cell, then the method may continue to operation 612 to deny the target cell's value from being updated based on the published cell's stored value. Thus, the permission attributed to the other user, as indicated by the social network, is used to determine whether a cell that is owned by the other user may reference the published cell.

In some example embodiments, the user 102 may use the client device 104 to access spreadsheet information that has been stored in the database 120, and the enterprise application platform 110 may provide this spreadsheet information to the user 102 using a spreadsheet template that is customized for the display capabilities of the client device 104. Further, the application servers 116 may implement location-based services. For example, the enterprise application platform 110 may filter the spreadsheet information in the database 120 based on location information of the client device 104 so that the spreadsheet information presented to the user 102 includes data that is relevant to the location information.

Figure 7:
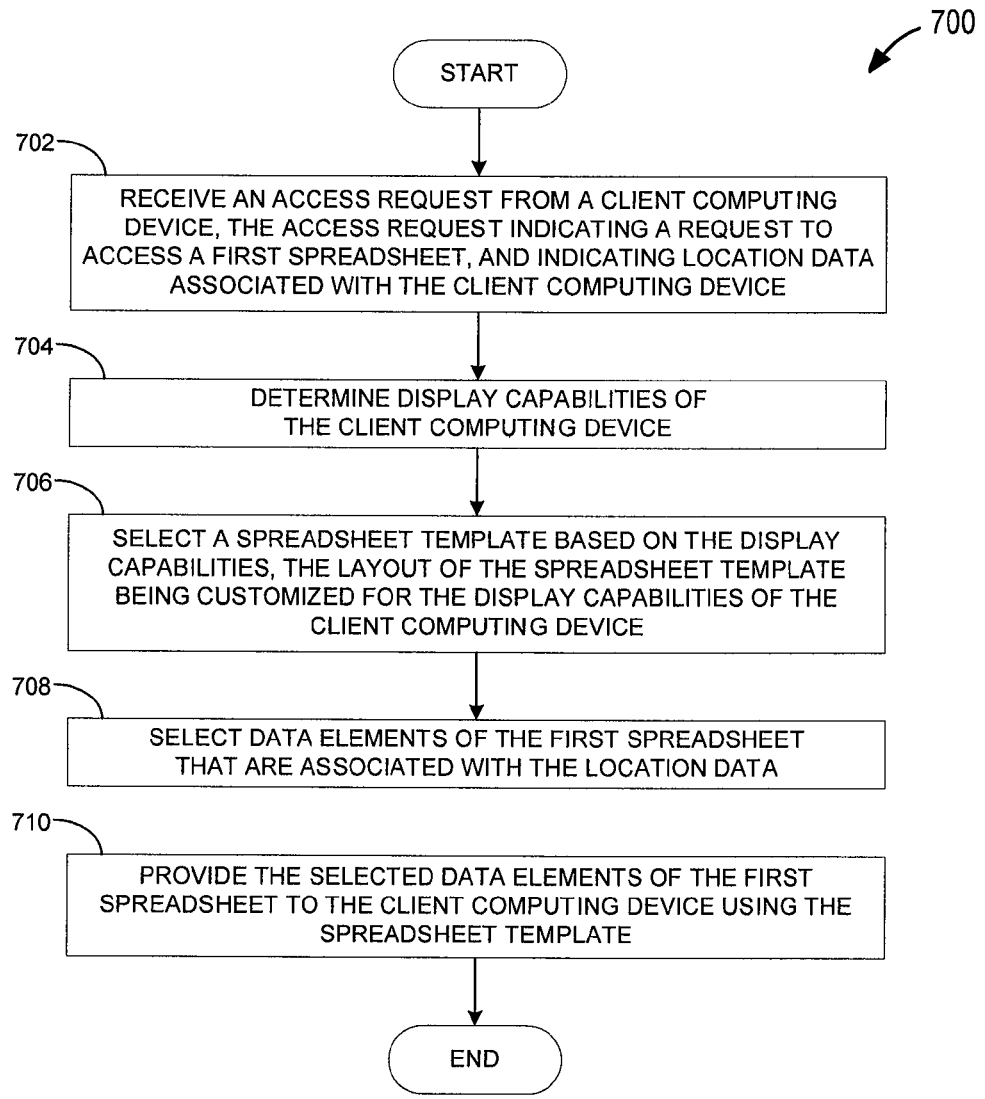
FIG. 7 shows a flowchart illustrating an example method for providing spreadsheet data to a client computing device.

FIG. 7 shows a flowchart illustrating an example method 700 for providing spreadsheet data to a client computing device. In some embodiments, the method 700 may be performed using the enterprise application platform 110 and, accordingly, is described by way of example with reference thereto. The method 700 may begin, at operation 702, by receiving an access request for a spreadsheet from the computing device 104. This access request may indicate that the user 102 desires to view the spreadsheet, may indicate display capabilities of the client device 104, and may indicate location information associated with the client device 104. In some example embodiments, the method 700 may use the computer-implemented social network to verify that the user 102 has read access to the spreadsheet. For example, the method 700 may access the profile information for the user 102 to verify that the profile information indicates that the user 102 has access to the spreadsheet. As another example, the method 700 may access permission information for the spreadsheet or profile information for the spreadsheet's publisher to verify that this information indicates that the user 102 has access to the spreadsheet.

At operation 704, the method 700 may determine display capabilities of the client device (e.g., based on the access request). Then, at operation 706, the method 700 may select a spreadsheet template based on the display capabilities for the client device 104. In some example embodiments, the layout for this spreadsheet template is customized for the display capabilities of the client computing device. For example, the spreadsheet template may have been created by the owner of the spreadsheet, and stored in the database 120. As another example, the spreadsheet template may be created automatically (without human intervention) by the enterprise application platform 110 for the client computing device 104.

As an example, the client device 104 may be a smart phone with a display of dimensions 960 pixels by 640 pixels, and the selected spreadsheet template may be a compact template that is customized for a display that has minimum dimensions of 480 pixels by 320 pixels. Thus, the selected spreadsheet template may be displayed within the display of the client device 104. As another example, client device 104 may be a tablet computing device with display dimensions 1024 pixels by 768 pixels, which may also display the selected spreadsheet template within the screen. However, for the tablet computing device, the method 700 may select an expanded spreadsheet template that includes more columns than the compact template, and thus is customized for a display that has minimum dimensions 1024 pixels by 640 pixels.

At operation 708, the method 700 may select data elements of the spreadsheet that are associated with the location data for the client device 104. For example, the user may be a real estate agent that is showing properties to a client, and the spreadsheet data may include a plurality of columns that include property listings for a plurality of cities in the United States. Thus, to provide the real estate agent with the most relevant information, the method 700 may select a subset of the spreadsheet's columns that include property listings for cities that are close to the real estate agent's current location. Then, at operation 710, the method 700 may provide the selected data elements of the spreadsheet to the client computing device 104 using the selected spreadsheet template.

Figure 8:
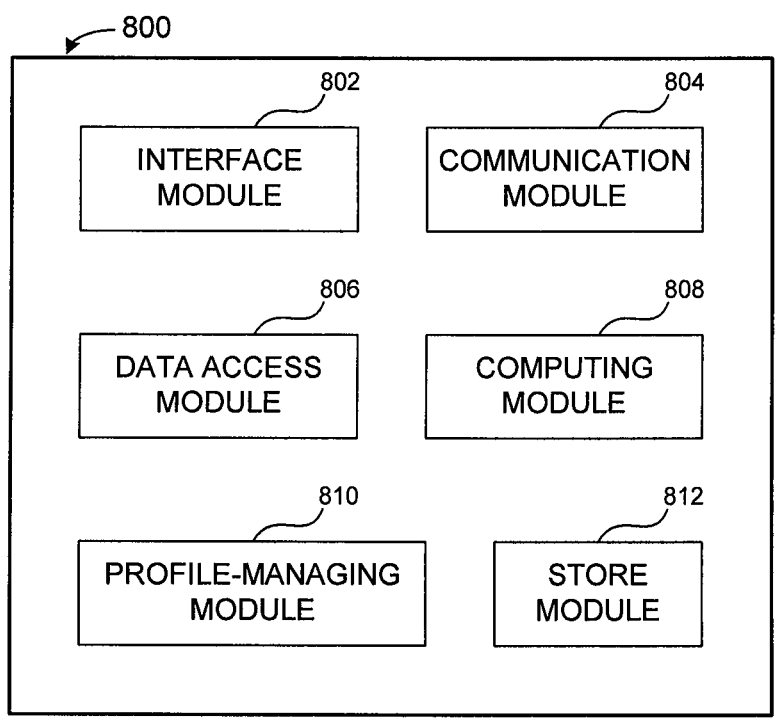
FIG. 8 illustrates an example apparatus, in accordance with various example embodiments.

FIG. 8 illustrates an example apparatus 800, in accordance with various example embodiments. The apparatus 800 may include an interface module 802, a communication module 804, a data access module 806, a computing module 808, a profile-managing module 810, and a store module 812. In particular embodiments, modules 802-812 may be implemented using one or more application-specific integrated circuit components, microprocessors, graphics processing units (GPUs), field-programmable gate arrays (FPGAs), or any combination thereof. In other embodiments, apparatus 800 may include a server-side computing device and/or a client side computing device, and modules 802-812 may include executable code that is stored within a computer-readable storage medium of apparatus 800 and executed by a processing unit of apparatus 800.

The interface module 802 may generate a GUI and/or a text-based user interface to interact with the user. For example, the interface module 802 may generate a web page for the client device 104 that implements the user interface 108 using a combination of scripting technologies such as HTML, JavaScript, Cascading Style Sheet (CSS), ActionScript, and/or the like. This web page may include the spreadsheet 132, and may include client-side instructions that are executed by the client device 104 to facilitate editing the spreadsheet 132, and to facilitate communicating with the web servers 112 and/or the API servers 114.

The communication module 804 may receive an update request indicating that the user's spreadsheet cell is to be updated, and may use the interface module 802 to notify the user that the spreadsheet cell may need to be updated. In some example embodiments, the communication module 804 may generate the update request for the user's spreadsheet cell when it receives an updated value for a cell that is referenced by the user's spreadsheet cell.

The data access module 806 may determine that the user's spreadsheet cell references one or more other cells, and may use the store module 812 to determine a stored value for a referenced cell. Further, the computing module 808 may compute an updated value for the user's spreadsheet cell based on the stored values for the referenced cells, and may use the store module 812 to store the updated value for the user's spreadsheet cell. The computing module 808 may also generate an update request for other cells that reference the updated cell, and may provide this update request to the communication mechanism 802.

The profile-managing module 810 may manage a profile for a user of the computer-implemented social network. For example, the profile-managing module 810 may update the user's association with other members of the online social network based on friend requests and friend confirmations from the user and/or the other members. Further, the profile-managing module 810 may update a description for the user's role within an organization based on an organization graph that is received from an entity of the organization (e.g., a representative or manager of the organization), or based on organization-related information that is provided directly by the user and/or other members of the social network. The profile-managing module 810 may also attribute the user with access to a plurality of spreadsheet cells to which the user subscribes.

Example Computer System

Figure 9:
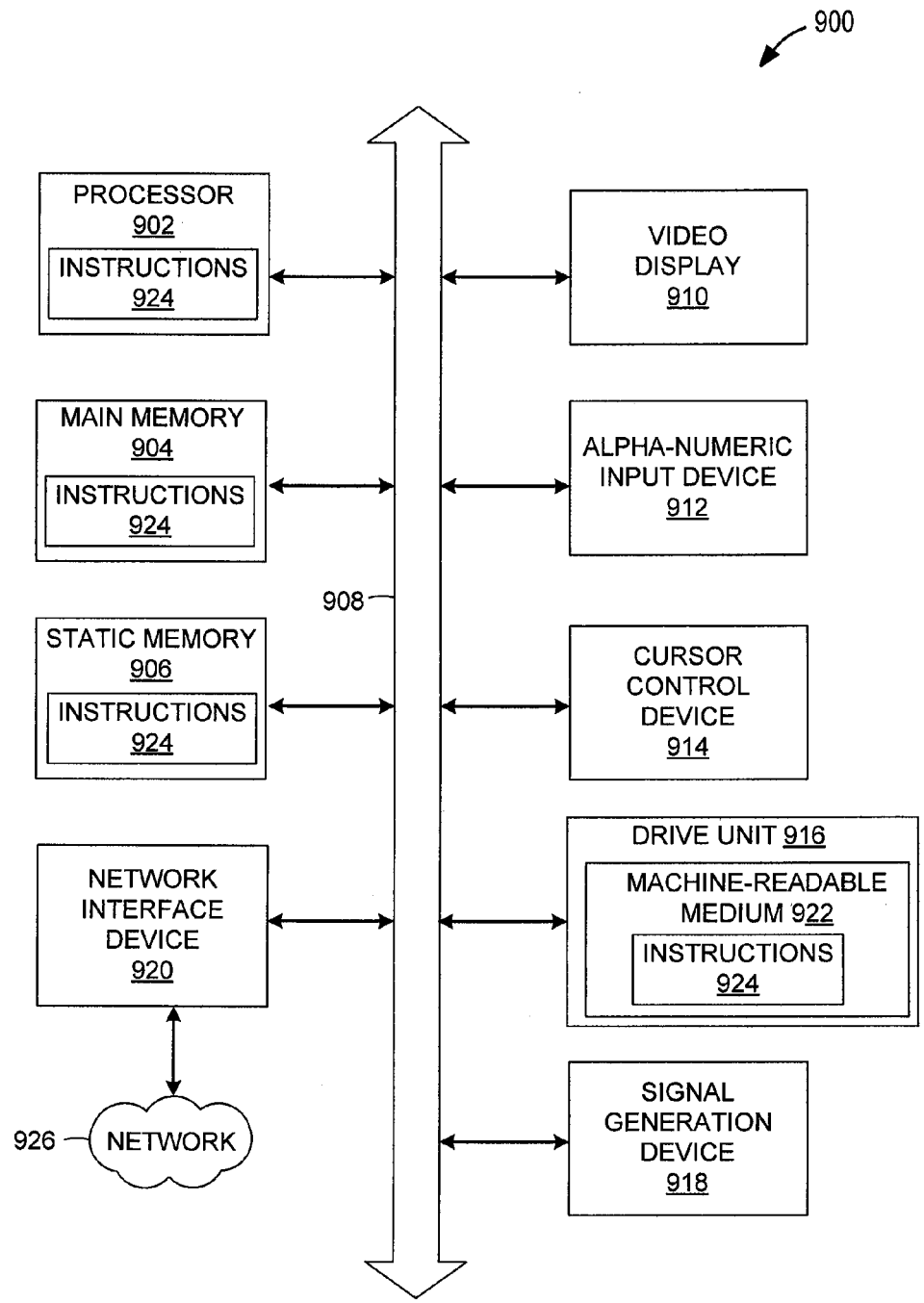
FIG. 9 shows a diagram that illustrates an example computer system.

FIG. 9 shows a diagram that illustrates an example computer system 900. Computer system 900 may include a set of instructions, which when executed by the computer system 900, may cause the computer system 900 to automatically perform any one or more of the methodologies discussed herein. In alternative example embodiments, the computer system 900 may operate as a standalone computer system or may be connected (e.g., via a network) to other computer systems.

In a network deployment, the computer system 900 may operate in the capacity of a server or a client system in server-client network environment, or as a peer computer system in a peer-to-peer (or distributed) network environment. For example, the computer system 900 may correspond to the client device 104 (e.g., the smart phone device 104.2), or may correspond to a server of the enterprise application platform 110 (e.g., an application server 116). Further, while a single computer system is illustrated, the term "system" shall also be taken to include any collection of systems that individually or jointly execute a set (or multiple sets) of electronically-coded instructions to perform any one or more of the methodologies discussed herein. The system may, for example, include a cloud computing landscape comprising a plurality of multi-processor servers, where the system may adapt the computing resources (e.g., a number of processors, server memory, disk storage, network bandwidth, and the like) used by a web application based on the resource demands of the web application and/or based on a request from a developer of the web application.

The example computer system 900 may includes a processor 902 (e.g., a central processing unit (CPU), a graphics processing unit (GPU), a field-programmable gate array (FPGA), or any combination thereof), a main memory 904, and a static memory 906, which communicate with each other via a bus 908. The computer system 900 may further include a video display unit 910 (e.g., liquid crystals display (LCD) or a cathode ray tube (CRT)). The computer system 900 also includes an input device 912 (e.g., a keyboard or a touch-screen interface of the display unit 910), a cursor control device 914 (e.g., a mouse or the touch-screen interface), a disk drive unit 916, a signal generation device 918 (e.g., a speaker) and a network interface device 920.

The disk drive unit 916 may include a machine-readable medium 922 on which is stored one or more sets of electronically-coded instructions (e.g., software 924) embodying any one or more of the methodologies or functions described herein. The instructions 924 may also reside, completely or at least partially, within the main memory 904, the static memory 906, and/or within the processor 902 during execution thereof by the computer system 900. The main memory 904 and the processor 902 also may constitute machine-readable media.

The term "machine-readable medium" shall be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and/or the like.

The illustrations of embodiments described herein are intended to provide a general understanding of the structure of various embodiments, and they are not intended to serve as a complete description of all the elements and features of apparatus and systems that might make use of the structures described herein. Other embodiments may be utilized and derived therefrom, such that structural and logical substitutions and changes may be made without departing from the scope of this disclosure. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A computer-implemented method comprising:
    receiving a first update request for a second cell of a second spreadsheet from a second user that owns the second spreadsheet, the first update request indicating that the second cell of the second spreadsheet is to be updated, the second cell including a reference to a first cell of a first spreadsheet, the first spreadsheet being owned by a first user, the second user not being the first user;
    based on the reference to the first cell, determining a stored value being stored on a server computer for the first cell;
    granting the second user access to read the first cell responsive to the second user subscribing to the first cell, the subscribing to the first cell by the second user including a fee;
    using at least one processor, computing a first updated value for the second cell of the second spreadsheet based on the stored value for the first cell; and
    providing, to a computing device, a query result that includes the stored value for the first cell.

2. The method of claim 1, further comprising:
    receiving a second updated value for the first cell of the first spreadsheet;
    storing, at the server computer, the second updated value for the first cell, the stored value including a reference to the first cell; and generating a notification to the second user responsive to determining that the second cell of the second spreadsheet references the first cell.

3. The method of claim 2, wherein the receiving of the second updated value comprises an operation selected from the group consisting of:
receiving a data entry; the data entry including the updated value for the first cell of the first spreadsheet;
receiving a database query result; and
computing the second updated value in response to receiving a second update request indicating that the first cell of the first spreadsheet is to be updated.

4. The method of claim 2, further comprising:
responsive to the receiving of the second updated value for the first cell, determining that a third cell of a third spreadsheet references the first cell; and
computing a third updated value for the third cell in parallel to the computing of the first updated value for the second cell.

5. The method of claim 1, further comprising:
receiving, from the computing device, a database query that includes the reference to the first cell; and
wherein:
the providing, to the computing device, of the query result that includes the stored value for the first cell is in response to the receiving of the database query.

6. The method of claim 1, wherein the reference includes an identifier selected from the group consisting of:
a logical reference; and
a static reference indicating a cell within a spreadsheet.

7. The method of claim 1, wherein the server computer includes a computer implemented social network.

8. The method of claim 7, wherein the first user and the second user are users of the computer-implemented social network.

9. The method of claim 8, wherein access to a spreadsheet includes at least one of:
read-only access, read-write access, and results-only access; and
wherein the method further comprises:
responsive to determining that a third user has results-only access to the second spreadsheet, attributing the third user with access to read the first updated value for the second cell of the second spreadsheet without providing the third user access to read an expression used to compute the first updated value.

10. The method of claim 9, wherein at most one user of the computer-implemented social network has read-write access to the second spreadsheet.

11. The method of claim 9, wherein
the first user and the second user are members of an organization; wherein
a relationship between the first user and the second user within the computer-implemented social network is based on an organization chart for the organization; and
wherein the providing of the stored value to the second spreadsheet comprises determining that the second user has access to read at least the first cell of the first spreadsheet based on the relationship between the first user and the second user.

12. The method of claim 9, further comprising:
publishing the first cell of the first spreadsheet using the computer-implemented social network responsive to receiving a publication request from the first user; and
wherein the computing of the first updated value based on the stored value for the first cell comprises determining that the second user has access to read the first cell of the first spreadsheet.

13. The method of claim 1, further comprising:
receiving, from a client computing device, an access request to access the first spreadsheet;
determining display capabilities of the client computing device;
selecting a spreadsheet template based on the display capabilities, the layout of the spreadsheet template being customized for the display capabilities of the client computing device; and
providing, to the client computing device, contents of the first spreadsheet using the spreadsheet template.

14. The method of claim 13, wherein
the receiving of the access request includes receiving location data associated with the client computing device; and wherein
the providing of the contents of the first spreadsheet to the client computing device comprises selecting data elements of the first spreadsheet that are associated with the location data.

15. The method of claim 1, further comprising causing the second user to be presented with a notification to update the second cell, based on detecting that the stored value of the first cell has changed; and wherein the first update request was generated by a response to the notification.

16. The method of claim 1, wherein the second user has results-only access to the first cell.

17. An apparatus comprising:
a memory having instructions embodied thereon;
one or more processors coupled to the memory and configured by the instructions to perform operations comprising;
receiving a first update request for a second spreadsheet owned by a second user, the first update request indicating that at least a second cell of the second spreadsheet is to be updated, the second cell including a reference to a first cell of a first spreadsheet owned by a first user; and
responsive to determining that the second user has results-only access to the second cell, attributing the second user with access to read a first updated value for the second cell without providing the second user access to read an expression used to compute the first updated value;
determining, based on the reference to the first cell, a stored value being stored on a server computer for the first cell; and
granting the second user access to read the first cell responsive to the second user subscribing to the first cell, the subscribing to the first cell by the second user including a fee;
computing the first updated value for the second cell of the second spreadsheet based on the stored value for the first cell; and
providing to a computing device, a query result that includes the stored value for the first cell.

18. The apparatus of claim 17, wherein the receiving of the first update request comprises receiving an indication from the second user that at least the second cell of the second spreadsheet is to be updated.

19. The apparatus of claim 17, wherein the receiving of the first update request comprises:
receiving a second updated value for the first cell of the first spreadsheet;

storing, at the server computer, the second updated value for the first cell, the stored value including a reference to the first cell; and generating the first update request for the second spreadsheet responsive to determining that the second cell of the second spreadsheet references the first cell.

20. The apparatus of claim 19, wherein the receiving of the second updated value comprises an operation selected from the group consisting of:

receiving a data entry from the first user, the data entry including the updated value for the first cell of the first spreadsheet;

receiving a database query result; and computing the second updated value for the first cell in response to receiving a second update request indicating that the first cell is to be updated.

21. The apparatus of claim 19, wherein the operations comprise:

determining that a third cell of a third spreadsheet references the first cell in response to the communication module receiving the second updated value for the first cell; and computing a third updated value for the third cell in parallel to the computing of the first updated value for the second cell.

22. The apparatus of claim 17, wherein the operations further comprise:

receiving, from the computing device, a database query that includes the reference to the first cell; and wherein:

the providing, to the computing device, of the query result that includes the stored value for the first cell is responsive to the receiving of the database query.

23. The apparatus of claim 17, wherein the apparatus implements a computer-implemented social network, and wherein the apparatus further comprises a profile-managing module to manage a profile for a user of the computer-implemented social network.

24. The apparatus of claim 23, wherein the first user and the second user are users of the computer-implemented social network.

25. The apparatus of claim 24, wherein the first user and the second user are members of an organization; wherein a relationship between the first user and the second user within the computer-implemented social network is based on an organization chart for the organization; and wherein the providing of the stored value to the second spreadsheet comprises determining that the second user has access to read at least the first cell of the first spreadsheet based on the relationship between the first user and the second user.

26. The apparatus of claim 24, wherein:

the operations further comprise:

publishing at least the first cell of the first spreadsheet using the computer-implemented social network in response to receiving a publication request from the first user; and the computing of the first updated value based on the stored value for the first cell comprises determining that the second user has access to read at least the first cell of the first spreadsheet.

27. The apparatus of claim 17, wherein the operations further comprise:

receiving, from a client computing device; an access request to access the first spreadsheet;

determining display capabilities of the client computing device based on the access request;

selecting a spreadsheet template based on the display capabilities, the layout of the spreadsheet template being customized for the display capabilities of the client computing device; and providing, to the client computing device, contents of the first spreadsheet using the spreadsheet template.

28. The apparatus of claim 27, wherein:

the access request includes location data associated with the client computing device, and the operations further comprise:

selecting of the first spreadsheet that are associated with the location data.

29. A non-transitory computer-readable storage medium storing instructions, which when executed by one or more processors perform operations comprising:

determining that a first cell of a first spreadsheet has received an updated value, the first spreadsheet being owned by a first user;

generating an update request for a second spreadsheet owned by a second user, the update request indicating that at least a second cell of the second spreadsheet is to be updated, the second cell including reference to the first cell of the first spreadsheet;

determining that the second user has accepted the update request, the second user not being the first user;

based on the reference to the first cell, determining a stored value being stored on a server computer for the first cell;

granting the second user access to read the first cell responsive to the second user subscribing to the first cell, the subscribing to the first cell by the second user including a fee;

computing an updated value for the second cell of the second spreadsheet based on the stored value for the first cell; and providing, to a computing device, a query result that includes the stored value for the first cell.

* * * * *